United States Patent
Maurer et al.

(10) Patent No.: US 9,033,253 B2
(45) Date of Patent: May 19, 2015

(54) DESIGNER-ADAPTIVE VISUAL CODES

(75) Inventors: Ron Maurer, Haifa (IL); Ehud Chatow, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 187 days.

(21) Appl. No.: 13/809,698

(22) PCT Filed: Jul. 28, 2010

(86) PCT No.: PCT/US2010/043547
§ 371 (c)(1),
(2), (4) Date: Jan. 11, 2013

(87) PCT Pub. No.: WO2012/015402
PCT Pub. Date: Feb. 2, 2012

(65) Prior Publication Data
US 2013/0112751 A1    May 9, 2013

(51) Int. Cl.
*G06K 19/06* (2006.01)

(52) U.S. Cl.
CPC ............... *G06K 19/06046* (2013.01)

(58) Field of Classification Search
USPC ............ 235/457, 462.01, 494, 462.08
See application file for complete search history.

(56) References Cited

U.S. PATENT DOCUMENTS

| | | | | |
|---|---|---|---|---|
| 5,303,312 | A * | 4/1994 | Comerford et al. | 382/189 |
| 5,416,989 | A * | 5/1995 | Preston | 36/108 |
| 5,507,527 | A | 4/1996 | Tomioka et al. | |
| 7,296,747 | B2 | 11/2007 | Rohs | |
| 7,310,769 | B1 * | 12/2007 | Dash | 715/269 |
| 7,457,007 | B2 | 11/2008 | Silverbrook et al. | |
| 2003/0157305 | A1 * | 8/2003 | Abraham | 428/195.1 |
| 2005/0139680 | A1 * | 6/2005 | Anttila et al. | 235/462.46 |
| 2006/0036977 | A1 * | 2/2006 | Cohn et al. | 716/4 |
| 2007/0045427 | A1 * | 3/2007 | Onishi | 235/494 |
| 2007/0143737 | A1 * | 6/2007 | Huang et al. | 717/103 |
| 2007/0211063 | A1 * | 9/2007 | Sawazaki | 345/467 |
| 2008/0301431 | A1 * | 12/2008 | Hea | 713/150 |
| 2009/0026276 | A1 | 1/2009 | Yulevitch | |

(Continued)

FOREIGN PATENT DOCUMENTS

| | | |
|---|---|---|
| KR | 100404306 B1 | 11/2003 |
| WO | WO-2004084125 A1 | 9/2004 |

OTHER PUBLICATIONS

Adelmann, et al, "Mobile Phone Based Interaction with Everyday Products—on the Go", 2007 Int'l conf on Next Generation Mobile Applications.

Heikki Ailisto, et al, "Bridging the physical and virtual worlds by local connectivity-based physical selection" Pers Ubiquit Comput (2006,10, 333-344.

(Continued)

*Primary Examiner* — Tuyen K Vo
(74) *Attorney, Agent, or Firm* — Dierker & Associates; Julia Dierker

(57) ABSTRACT

A designer-adaptive visual code (32, 32', 32") includes a user-selected set glyphs (36, 36', 36", 36'–), a user-selected set of allowable glyph orientations relative to a user-selected reference angle, and a user-selected spatial arrangement of the glyphs (36, 36', 36", 36'''). The user-selected set of glyphs (36, 36', 36", 36''') has a size sufficient to recover geometric characteristics of at least one repeating code portion so as to generate an analyzable image when captured via a camera-equipped mobile device (26). The user-selected spatial arrangement of the glyphs (36, 36', 36", 36''') includes the at least one repeating code portion (34) to be visible on a surface from at least two different areas of the surface.

15 Claims, 9 Drawing Sheets

(56) References Cited

U.S. PATENT DOCUMENTS

| | | |
|---|---|---|
| 2009/0231270 A1* | 9/2009 | Vartiainen et al. ............ 345/156 |
| 2010/0088178 A1* | 4/2010 | Gnanasambandam et al. .......................... 705/14.49 |
| 2011/0205569 A1* | 8/2011 | Eschbach et al. ............ 358/1.11 |

OTHER PUBLICATIONS

Michael Rohs et al, "Using Camera-Equipped Mobile Phones for Interacting With Real-World Objects", Inst for Pervasive Computing, Research paper.

* cited by examiner

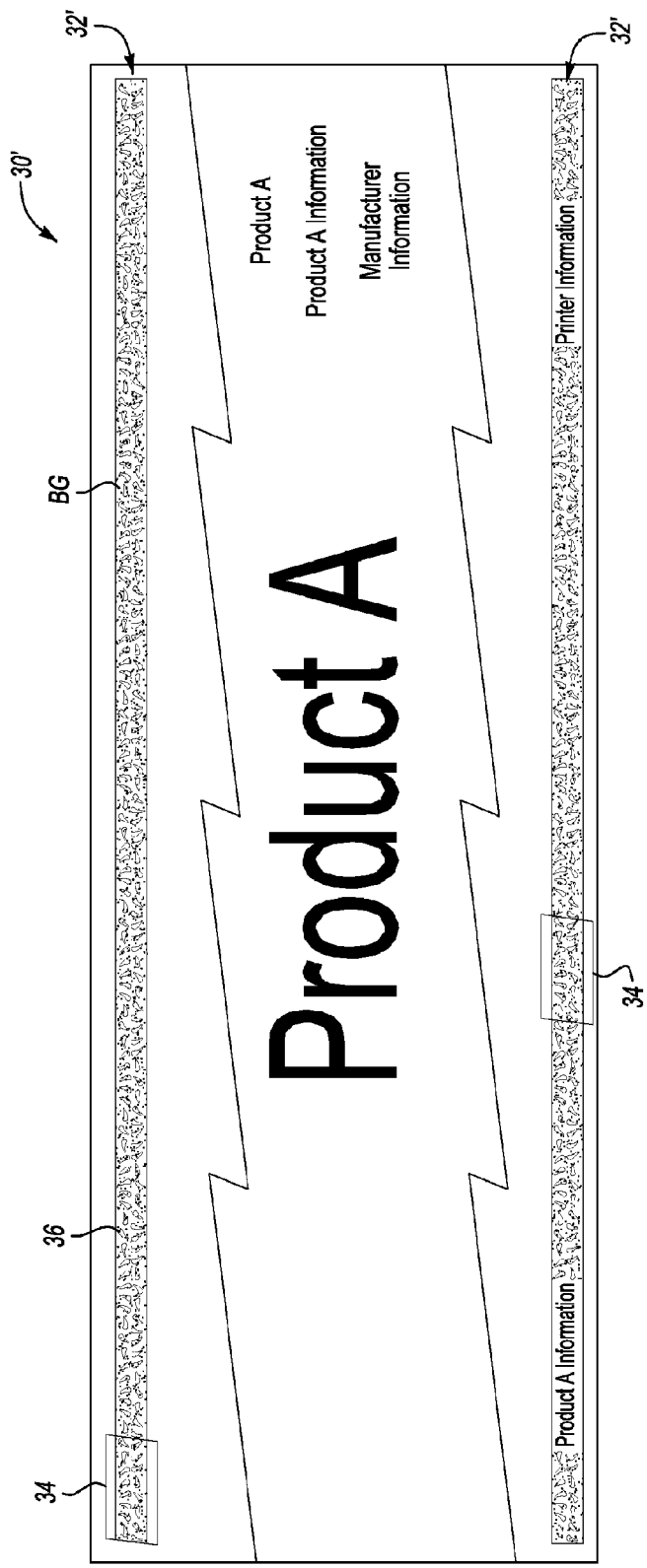

DESIGNER-ADAPTIVE VISUAL CODES

BACKGROUND

The present disclosure relates generally to designer-adaptive visual codes.

Consumer products may be tagged with identification information by printing the information directly on the product, by printing the information directly on the product's packaging, or by printing the information on a label which is adhered to the product and/or the product packaging. Information tags are available using a variety of technologies, including visual codes (e.g., bar codes), radio frequency ID tags (RFID tags), micro-particles, etc. Many of these information tags require specially equipped hardware, such as readers or scanners, in order to read the information.

BRIEF DESCRIPTION OF THE DRAWINGS

Features and advantages of embodiments of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIGS. 6A and 6B are embodiments of a label including two variations of a designer-adaptive visual code;

DETAILED DESCRIPTION

Embodiments of the designer-adaptive visual codes (also referred to herein as graphical codes) disclosed herein may be printed on a medium or included in an image (e.g., a hologram) that is illuminated, e.g., on a screen. In one embodiment, the system disclosed herein provides flexible design capability which enables a user to create the visual code (e.g., from a set of graphics or from graphical templates) to his/her liking. The look of the visual code is aesthetically pleasing to at least the use creating the visual code, and can be manipulated to blend with other graphical designs to be included on the medium or in the image. Since the design of the visual/graphical code can be configured to flow with other graphical designs, the visual code is not spatially limited to a particular place on the medium or image (in contrast to a bar code which is often compact and placed in the back or on the side of an object due to its stark contrast to the rest of the graphical design). In fact, the embodiments of the visual code disclosed herein include a repeating code portion that is visible from at least two different areas of the medium or image. The placement of the repeating code portions enables a totality of information to be present spatially scattered such that the repeating portion and all of the information can be captured (e.g., via ubiquitous means carried by consumers, e.g., a camera-equipped mobile phone) from multiple angles. When implemented on an object or a label for the object, the redundant placement of the repeating code portion allows the code portion to be captured without the consumer having to hold, move, and/or rearrange the object bearing the label.

Figure 1:
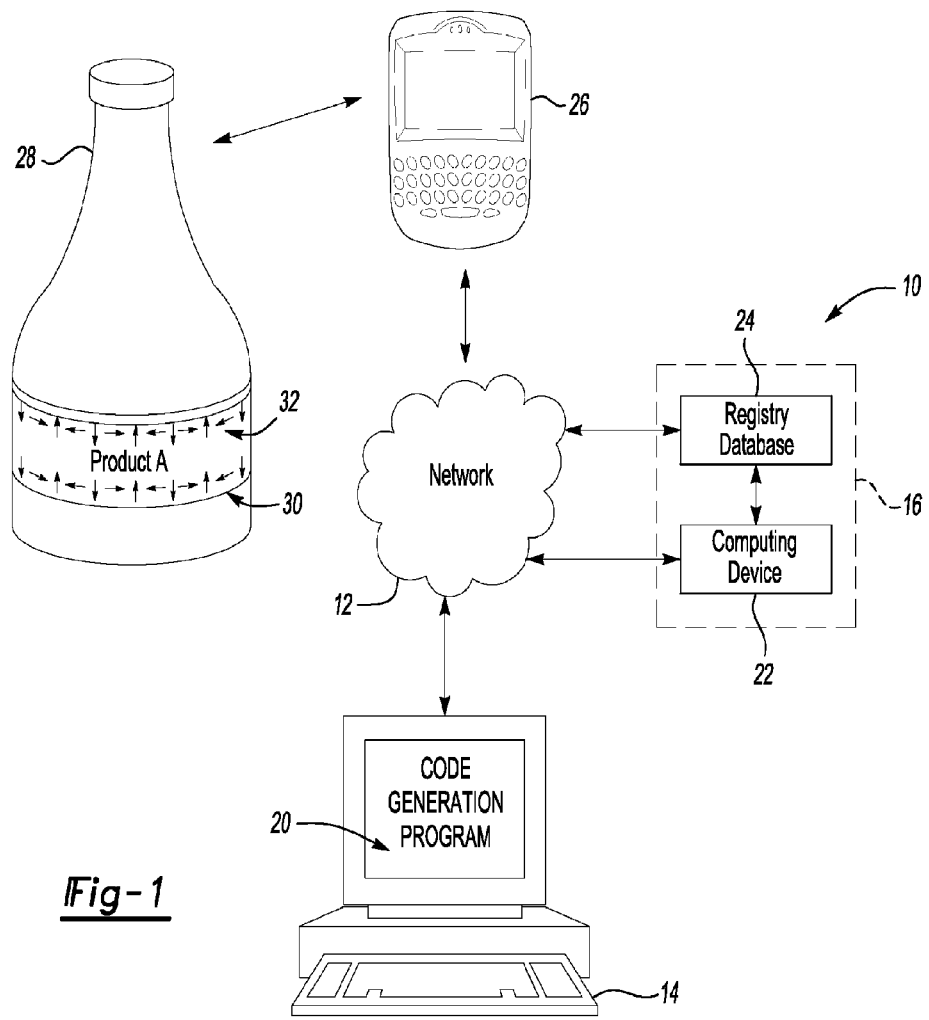
FIG. 1 is a schematic, view of an embodiment of a system for forming a designer-adaptive visual code.

Referring now to FIG. 1, an embodiment of the system 10 for creating an embodiment of a designer adaptive visual code 32 is depicted. The system 10 includes a cloud computing network 12, which is a virtualized bank of computers (e.g., processors and/or servers) that enables Internet-based computing. Via the cloud network 12, shared resources, software and information are provided to various computing devices 14 (whether stationary (e.g., desktop computers) or mobile (e.g., laptop computers, netbooks, cellular phones, personal digital assistants (PDAs), etc.)) on-demand. The cloud computing network 12 allows a visual code and registry system provider (not shown) to deliver a central computing system 16 and its various services (e.g., visual code creation, product to visual code association, registry storage, etc.) to subscribers online via another web service or software, such as a web browser. Software and data associated with the cloud computing network 12 are stored on servers and their associated memory (not shown).

As used herein, subscribers (not shown) include those companies and/or individuals who sign up for one or more services offered by the owner/operator of the central computing system 16. A subscriber may also be referred to herein as a user.

Subscribers gain access to the central computer system 16 via a web service (e.g., a website, webpage, etc.) that provides and displays an access point 20 into the system 16. For example, the access point 20 may be an on-line application that requires log-in, authorization, access rights, etc. The access point 20 may be accessed via any computing device 14 configured to link to the cloud computing network 12. While a single computing device 14 is illustrated in FIG. 1, it is to be understood that a single subscriber may have any number of computing devices 14. The access point 20 may include data entry fields that allow a user to enter personal (e.g., a login ID) and authenticating information (e.g., a password, a PIN, etc.). In other instances, the computing device 14 used to access the access point 20 may include other hardware which, for example, can receive and read a smart card for identification/authentication purposes, or can utilize biometrics for identification/authentication purposes. In the latter example, the device 14 includes or is operatively connected to equipment that takes repeated measurements of physiological and behavioral characteristics to verify the user's identity. Any identifying information entered via, the access point 20 is transmitted via the cloud computing network 12 and is received by a back-end (networked) computing device 22 (e.g., a virtualized and/or redundant processor), which analyzes the information and either allows or denies the requesting user access to the system 16.

When the information received at the access point 20 is verified by the back-end computing device 22, the user is able to virtually enter the central computer system 16. Upon logging in, the user may access his/her account, information stored therein, and any of the programs offered by system 16 and to which the user has subscribed.

The system 16 includes at least the computing device 22 and a registry database 24. It is to be understood that the components of the system 16 may be implemented in a consolidated location, or portion(s) of the system 16 may be implemented at different locations. It is to be further understood that each of these components is either directly or indirectly in operative communication with the cloud computing network 12. The computing device 22 includes respective software and/or programs that are configured to enable a user to generate a visual code (e.g., the visual code program discussed below) and to store the visual code in the registry database 24. The computing device 22 also includes software an for programs that are configured to receive images (including visual codes) from one or more mobile devices 26. The computing device 22 and/or the mobile device 26 is configured to run visual search algorithms (e.g., the visual search program discussed below) within the database 24 to identify objects (e.g. product 28) associated with the visual code in the received image. While a single one of each component is shown in FIG. 1, the system 16 may include multiple computing devices 22 and databases 24.

The visual code generation program is software including computer readable code for generating a digital code based upon a user-specified number of bits, computer readable code for generating a visual code 32 by processing i) a set of user-selected glyphs (e.g., symbols), ii) a user-selected set of allowable glyph orientations (e.g., preset angles at which a glyph can be rotated), and a user-selected spatial arrangement which includes a repeating code portion (e.g., row, multiple rows, a grid, a repeated compact geometrical arrangement, etc.) of the glyphs, computer readable code for encoding the digital code into the repeating code portion, and computer readable code for integrating the repeating code portion into a user-selected format. The computer readable codes are embodied on a computer readable medium which is read and processed by, for example, the computing devices 14 and 22.

A user of the visual code program is able to input commands from a set of privileged commands (e.g., in the case of a menu-driven control system), a free text command (e.g. in the case of a search driven system), or another user interface front end that is available once logged on to the system 16. In one embodiment for generating the visual code, the commands include inputting information that is to be encoded in the visual code, the selection (e.g., via a mouse click, drop and drag, etc.) of one or more glyphs from a predefined set of glyphs or user-designed glyphs, selection of a set of allowed glyph rotation angles and a reference angle, and selection of the spatial arrangement of the glyphs, which includes the repeating code portion. The user can also generate the background (e.g., label design, image design, etc.) with which the visual code is to be integrated. As such, user commands may also include, for example, selection of the shape of a label 30 or image, selection of the position(s) of the repeating code portion on the label 30 or within the image, and/or selection of colors and/or foreground patterns for the glyphs and/or the graphical design of the label 30 or image. It is to be understood that the color(s), foreground pattern(s), or other graphical designs do not carry decodable information. As such, these aspects influence the aesthetic appearance of the visual code and label 30 or image alone, which is convenient for a user because he/she has design flexibility. In another embodiment for generating the visual code, the commands include the selection of a predefined template (from a set of predefined templates) which includes preset glyphs and glyph rotations, label or image shape, and spatial arrangement. When using the visual code generation program to generate the visual code, the user may also upload and/or input other images, data, etc. that is related to, for example a product or object 28 to be associated with the label 30 or image bearing the repeating code portion.

At the outset, the user inputs the information that he/she wants to encode in a visual code. The information to be encoded may range from being relatively simple, such as standard barcode information which ranges from 12 to 14 bits, to being relatively complex, such as product lot identification, manufacturing date, and/or specific item identification (e.g., item number (e.g., VIN), lot number, etc) which may require 20 or more bits. This information will be supplied by the user of the system 10. In some instances, the information will originate from the user, and in other instances, the information will originate from someone other than the user, for example, the marketer, manufacturer and/or supplier of the product to be associated with the label 30 or image. In still other instances, the information will originate from a third party designer. The information received is used by the computing device 22 to generate a binary (bit) code (i.e., a digital code) that will ultimately be transformed into the visual code. The digital code will thus have a user-specified number of bits.

The digital code is then used to create visual code options for the user to select from, for generating the repeating code portion that will make up the visual code 32. The larger the number of bits required for encoding, the more complex the visual code will be. As such the total number of bits in the digital code will dictate, at, least in part, the options that are provided to the user regarding the glyph possibilities, the set of available glyph orientations, and the spatial arrangement of the glyphs. It is to be understood that the size of the alphabet (i.e., the number of glyph possibilities times the number of allowed rotations), and a number of glyphs in the repeating code portion defines the number of bits that can be encoded in the repeating code portion, and the repeating code portion is designed to encode the total number of bits of the digital code. Taking into account these parameters, the visual code generation program is configured to provide the user with options for generating a suitable visual code. In one embodiment, the visual code generation program identifies all possible glyphs, available glyph orientations (which cannot be manipulated by the user, except that he/she can define the reference angle), and spatial arrangements that can accommodate the generated digital code and that the user can select from. In another embodiment, the visual code generation program is configured to identify predefined templates with preset glyphs, orientations, and spatial arrangements that will accommodate the generated digital code, and that the user can select from. The user will be provided with the possibilities or templates for his/her choosing.

When the user opts to choose from templates, the predefined templates capable of supporting the digital code will be provided, and the user can select from these templates. When the template is a label template, the template may also have a preset label size and preset areas for inserting product information. In these embodiments, the user selects the template, and then has the option of adding color and/or patterns and uploading and/or adding object, manufacturer, printer, etc. information to accompany the visual code of the template.

When the user opts to design the visual code, it is to be understood that the user may be provided with the visual code options in a sequential manner. This is due to the fact that the selection of the set of glyphs can alter which spatial arrangements are available, and the selection of the set of glyphs and the spatial arrangement can alter the sets of available orientations for the glyphs. In one example, the user may first have the option of selecting the glyphs from the list of glyphs or a graphical alphabet including all available glyphs or symbols. Any number and type of glyph may be included in the graphical alphabet, including, but not limited to, geometric shapes, mathematical symbols, schematic representations of real objects (e.g., hands, pencils, leaves, stars, hourglasses, etc.), computer symbols, alphanumeric characters, or any other suitable symbol. In particular, the user is given the option to design his/her own glyphs, such that the glyphs will be in a graphic-design relation to graphical elements from the design of the background surface (e.g., a label, etc.). Each of the glyphs in the graphical alphabet has a predetermined minimum size that is large enough to be captured via a mobile phone imaging device. The predetermined minimum size is different for different glyphs depending upon their graphical complexity. In one embodiment, the minimum glyph size is on the order of 2 mm or larger. A user may enlarge this minimum size if that is desirable.

Since the coding power of a single glyph depends upon the number of glyphs and the set of orientations that are available, the visual code generation program can inform a user when his/her glyph selection is not suitable for the digital code. For example, if the required digital code size is 45 bits, and the user selects a two glyph with 16 orientations alphabet and a spatial configuration of a strip with a cycle of 8 glyphs, the visual code generation program will recognize that the encoding power of this visual code is $8 * \log_2 32 - \log_2 8 = 37$ bits, and will prompt the user to increase the coding power by either selecting two additional glyphs ($8 * \log_2 64 - 3 = 45$ bits), or increasing the cycle of the code to at least 10 symbols ($10 * \log_2 32 - \log_2 10 = 46.68$ bits $>45$ bits).

Once the set of glyphs are selected and accepted, the visual code generation program will provide the user with spatial arrangements that will accommodate the selected glyphs and enable the digital code to be encoded. The spatial arrangement is a geometric arrangement selected from a single line, multiple lines, a grid, or a repeated geometrical arrangement, such as squares, circles, ovals, coding flowers, nested coding flowers, etc. The spatial arrangement includes the repeating code portion. Selecting the spatial arrangement also dictates whether the repeating code portion will be part of a redundant, non-continuous geometrical arrangement or part of a continuous cycle with a user-specified cyclic dimension and a user-specified number of glyphs.

In some embodiments, the selection of the spatial arrangement also includes the selection of the number of glyphs to be included and the selection of the cyclic dimension. For example, when a single continuous line is selected, the user may have the option of selecting how many glyphs will be included in the repeating portion. In other embodiments, the selection of the spatial arrangement also includes the selection of the size of the repeated geometric arrangement and the selection of the number of repeated geometric arrangements will be used. For example, when a coding flower is selected, the user may have the option of how many coding flowers to include in the repeated geometric arrangements and how many times the geometric arrangement will be repeated.

The user is not able to select the number of allowed glyph orientations. Rather, based upon the glyph selection and spatial arrangement selection, the visual code generation program will determine a set of allowed glyph orientations that will enable the proper encoding of the digital code. The number of orientations is selected from the set of power of two, namely 4, 8, or 16, according to the glyph shape and size. The more orientations that are available, the more bits that can be encoded by each glyph (2, 3, or 4 respectively). Usually a setting of 16 orientations is desirable to maximize coding efficiency with respect to the area the code occupies on the surface. It is believed that more than 16 orientations would be hard to differentiate in the visual decoding phase, thus raising the decoding-error rate. It is to be understood that if the selected glyph is symmetric, than each of two antipodal orientations will appear the same, and up to 8 orientations may be used in these instances. Furthermore, for small glyph sizes, it may be harder to distinguish orientations with small differences in the decoding phase, and thus the visual code generation program will automatically reduce the number of orientations to 8 or 4. In some instances, the user is able to provide a starting angle relative to the horizontal axis of the target surface (e.g., the label surface), and the visual code generation program will rotate the selected glyphs in preset orientations relative to the user-selected starting or reference angle.

The code 32 is then integrated into any other graphical design selected or generated by the user. For example, if the user is generating a label 30, the code 32 will be implemented at desirable position(s) (e.g. top, bottom, sides, perimeter, etc.) on the label 30, where the positions are selected by the user. It is to be understood that the repeating code portion may be continuously repeated across the entire label 30 (see, e.g., FIGS. 5A through 5C) or can be strategically placed at different areas on the label 30 (see, e.g. FIG. 7).

The visual code generation program also includes computer readable code to support spatial invariance (e.g., invariance against shifts or rotations of the repeating code portion relative to the image capture device). Adding spatial invariance properties enable the repeating code portion to be robust against rotations by multiples of 90°. As such, if an object 28 having the label 30 with a code 32 thereon is displayed upside-down or on its side, the repeated code portion can still be decoded. Encoding and decoding is made invariant under rotation, flipping, etc. by grouping visual codes that are related to each other by rotation flipping, etc. into a single decoded value. This is accomplished by associating the visual codes with code words, that when decoded provide the single decoded value. More particularly, the repeating code portion at each of its 90° rotations is associated with a different code word that means the single decoded value. For example, if the repeating code portion included three glyphs at angles {0°, 45°, 180°} relative to the right horizontal direction when the product is in an upright position, then the code words at the respective 90° rotations on the side of the product could be at angles {90°, 135°, −90°}, {180°, −135°, 0°}, or {−90°, −45°, 90°}, and all of these code words would be linked to the same decoded value. Invariance is gained by grouping visual codes by exact operations into the single decoded value. However, obtaining invariance results in shrinking the number of bits that can be encoded in the visual code. Supporting rotational spatial invariance properties reduces the encoding power of the visual code by 2 bits, since each visual code configuration could be transformed into one of four possibilities by 90° rotations. When capturing any of these four possible codes, the decoding should recover the same information because the four possible codes related by 90° rotations are mapped to the same meaning. Similarly, supporting shift invariance properties reduces the number of bits that can be encoded by a periodic (i.e., cyclic) code configuration, according to the horizontal and vertical periods used. In one embodiment, the program is configured to automatically account for spatial invariance. In another embodiment, the user of the system 10 can manually edit for spatial invariance, for example, by selecting an option to run an algorithm that will account for spatial invariance.

It is to be understood that when the user selects colors and/or patterns, the visual code 32 and label 30 or image associated with the visual code 32 will reflect these selections.

As illustrated in FIG. 1, the central computing system 16 further includes the previously mentioned database 24. The registry database 24 includes hardware for storing data associated with visual codes 32, and in some instances objects 28 and labels 30. The registry database 24 also includes software for organizing the data, such that it is associated with a particular individual user or company, and software for retrieving information as a result of an image analysis/visual search performed by the computing device 22.

The database 24 is a secure system that is closed to unauthorized users, relatively open to authorized users, and selectively open to mobile device 26 requests. For example, an authorized user will have access to any programs that he/she has subscribed to (e.g., the program may be open source enabling the authorized use to select any available glyphs, colors, etc.), his/her account or a company account that he/she has access to, and any information stored in his/her account. However, even authorized users will not have access to data that is stored in other authorized users' accounts. As such, an authorized user will not be able to alter labels 30 or view codes that he/she is not associated with. As mentioned above, the security of the database 24 applies to information that is available to users, as well as to information that is disseminated in response to image analysis requests from mobile devices 26. In particular, when the system 16 analyzes a received image, any information sent to the requesting mobile device 26 will be information that had previously been authorized for release by the user who created the analyzed label.

When a user creates a visual code 32 and initiates storage of the visual code 32 in the database 24, the database 24 is further configured to cross-check the generated repeating portion 34 of the code 32 with other stored codes 32 to ensure that there is no duplication of the visual code 32. It is to be understood that when a user is intentionally generating a visual code 32 that is repetitive of an existing visual code 32 already associated with his/her product, the cross-check may be by-passed. One example of this embodiment is when a user simply wants to change the colors of his/her existing and stored label. The by-pass option will not be available if the generated visual code 32 duplicates a code owned by another user.

While not shown in FIG. 1, the system 10 may also include a printer or a printing service that receives a digital version of the completed visual code 32 or object label 30 and prints the visual code 32 or label 30 on the desired object 28 or on a medium that can be affixed to the object 28. In one embodiment, the printer is a component of the central computing system 16. One non-limiting example of a suitable printer is a digital press printer, such as the HP Indigo WS6000 Digital Press. In some instances, the printing service actually offers the label generation program.

The system 10 may also include a suitable projector for illuminating a digital image that includes the visual code 32.

As used herein, the term "object" 28 refers to a product or document, or to the packaging for a product or document. The terms "package" and "packaging" include any unit for containing a product or document, displaying a product or document, or otherwise identifying a branded good. Non-limiting examples of packages include attachable labels, anti-tamper strips (which tear when removal is attempted), boxes, bags, containers, clamshells, bands, tape, wraps, ties, bottles, vials, dispensers, or the like, or combinations thereof.

Also as used herein, the term "object label" 30 includes at least the previously mentioned designer-adaptive visual code graphical code) 32. In some instances, the object label 30 also includes graphical design(s) associated with the product or document, trademark(s) associated with the product or document, information about the product or document itself, information about the manufacturer of the product or document, and/or information about the company printing the label, and/or other like information. It is to be understood that an object label 30 may be printed on the object itself (i.e., on the product, on the document, or on the packaging), or on another medium that is adhered to or otherwise attached to the object 28 (for example, the adhesive label heat is adhered to the bottle 28 shown in FIG. 1).

The mobile device 26 is any suitable mobile electronic device that has an image capturing device embedded herein. A non-limiting example of the mobile device 26 is a camera phone. The mobile device 26 is configured to capture a digital image of at least a portion of the object label 30 including the repeating code portion of the graphical code 32. In one embodiment, the mobile device 26 is also configured (e.g., with suitable software, algorithms, etc., such as a dedicated application downloaded to the mobile device 26) to transmit the digital image to the central computing system 16, where image analysis will take place. In another embodiment, the dedicated application for the mobile device 26 enables the phone 26 to perform the image analysis. In still another embodiment, some image analysis is performed by the mobile device 26 and some image analysis is performed by the central computing system 16, and thus a hybrid system is used for image analysis.

The computing device 22 of the central computing system 16 and/or the mobile device 26 includes the previously mentioned visual search program, which is configured to receive the images taken by the mobile device 26 and perform visual decoding and binary decoding. Visual decoding involves running visual search algorithms within the database 24 to i) identify one or more objects 28 associated with the visual code 32 in the received image or ii) identify a predefined template that was used to generate the graphical code 32. In particular, the visual search program identifies the visual code 32 in the received image, and searches the database 24 for a matching visual code 32. When searching, the program searches for the type and orientation of the glyphs in the code 32, and does not search for colors and/or patterns. This allows a user more design freedom when creating the visual code 32 because the repeating portion can be used multiple times without each occurrence of the repeated portion having to, be the same color and/or pattern (see, e.g., FIG. 7). The initial search of the database 24 may be performed at relatively low resolution because the texture and characteristics of the visual code 32 alone are analyzed (e.g., the type of glyphs and orientations of the glyphs are analyzed). The resolution at which the initial visual search is performed depends at least upon the third party technology used to capture the image and the expected capture distance. It is to be understood that higher resolution may be used if the confidence level of the identification of the visual code is not at a suitable value.

When the visual code 32 is a one-to-one match with the associated object 28 (i.e., the user generates the code 32 specifically for the object 28 and without using a template), the visual search can identify the object 28 linked with the repeated portion of the code 32. However, in order to obtain more specific object information (e.g., item ID), the digital code embedded in the visible code 32 has to be decoded. The visual search program is configured to process a small portion (e.g., the identified repeated portion) of the identified graphical code 32 at a higher resolution (i.e., up to one order of magnitude higher than the low resolution) in order to decode the embedded digital code. Each single character in the repeating code portion is decoded by identifying the glyphs and their respective positions and orientations. The positions and orientations are decoded with respect to some absolute reference (e.g., gyro, absolute axis on the media surface, visual guides, such as label edges, etc.). The positions and orientations can be mapped to an allowed set of positions and orientations for the code 32 in the database 24. The single characters can be converted into the N bits of information per character according to the bit-depth per character Finally, spatial invariance redundancies are taken into account to produce the final decoded code word (and thus the single decoded value).

When the visual code 32 is not a one-to-one match with the associated object 28 (i.e., the user generates the code 32 using a pre-designed template that is available to all users), the visual search can identify the template used. However, in order to obtain general object information and more specific object information, the digital code embedded in the visual code 32 of the template has to be decoded. The visual search program is configured to process a small portion (e.g., the identified repeated portion) of the identified visual code 32 of the template at a resolution suitable for decoding the embedded digital code. The position and resolution needed for second stage detection (i.e., decoding) are defined by the template that is identified during the first stage detection. The resolution needed during second stage detection/decoding is generally higher than the resolution needed during first stage detection/template identification. Decoding is accomplished as previously described.

In some embodiments, the computing device 22 is configured to transmit at least the object identity to the requesting mobile device 26. In an embodiment in which image analysis is performed on the mobile device 26, the mobile device 26 identifies the object 28. When creating a visual code 32 (and in some instances, label 30 or image), the user may input guidelines and rules (to be save in his/her account and linked to the visual code 32) about the type of information that should be sent when the repeating code portion is identified in an image taken by the mobile device 26. The information that may be transmitted includes the general product identification, the more specific item identification, vendor and/or retailer information, price information, or the like. In one non-limiting example, a user may not want the item ID passed on to the requesting device 26, and thus will activate a setting for sending the general object information (e.g., product name, price, vendor's webpage) to the requesting device 26 without sending the item ID.

The central computer system 16 and/or mobile device 26 may also be configured to identify the user (i.e., the creator of the visual code 32) whenever his/her object 28 is the subject of an inquiry from a mobile device 26. Similarly, the user account may be flagged so that when the object 28 is the subject of an inquiry, the system 16 will notify a particular vendor, retailer, or other party for business analytics purposes or for track-and-trace purposes. As an example of the business analytics, it may be desirable for manufacturers and/or retailers to know when a potential customer is interested in their product 28 when in the store, so that the manufacturer and/or retailer can interact (either personally or via the mobile device 26) with the customer for informational and promotional purposes. An additional benefit to the business of this interaction is the valuable business information that the product 28 was the focus of interest of a certain customer in a certain store at a certain time. This business information can be even more valuable if the product item is individually identified (e.g., unique coding is utilized), as this opens the way for track and trace information beyond the currently available information along the supply chain. For example, a fake product could be identified if an item with the same identity was spotted elsewhere, and business analytics can be obtained about the time it takes product batches to get to a certain store, or the statistics of the age at which items are bought.

Figure 2:
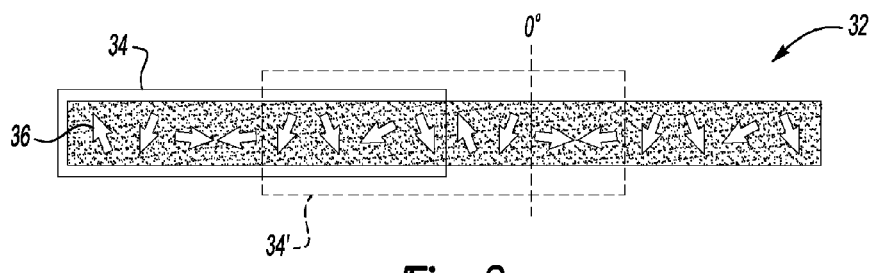
FIG. 2 is an embodiment of a designer-adaptive visual code with a repeating code portion that includes a single glyph and has a period width of eight.
Figure 3:
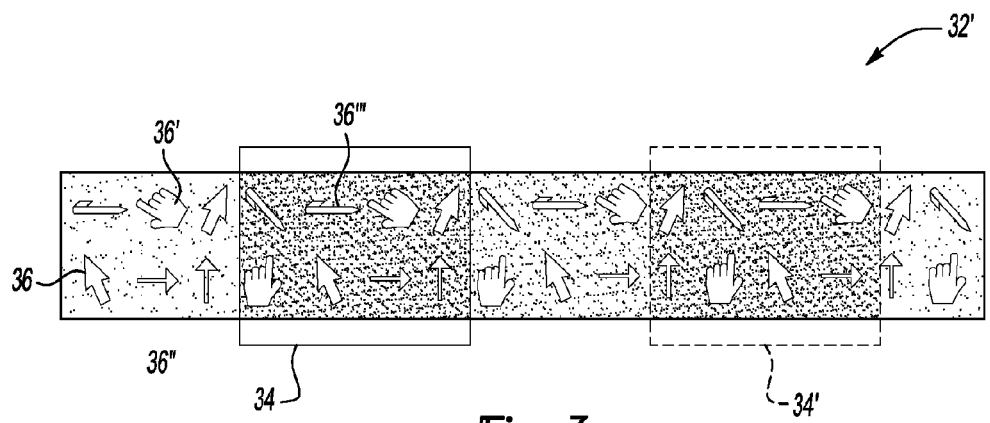
FIG. 3 is another embodiment of a designer-adaptive visual code with a repeating code portion that includes four different glyphs and has a coding window of 4×2.
Figure 4:
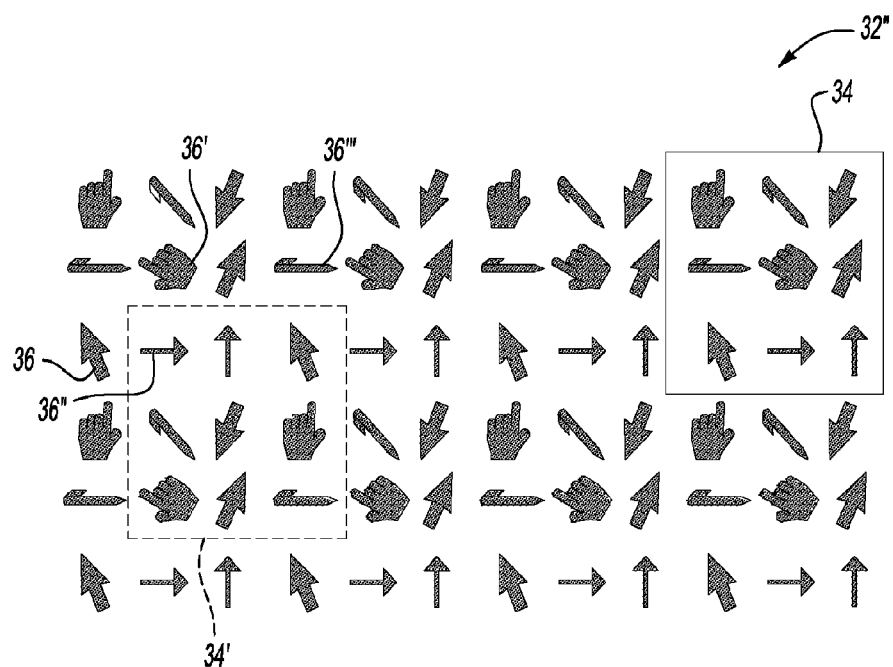
FIG. 4 is still another embodiment of a designer-adaptive visual code with a repeating code portion that includes four different glyphs and has a coding window of 3×3.

FIGS. 2 through 4 illustrate different example embodiments of the visual code 32, 32', 32" that can be generated using the system 10 shown in FIG. 1. As illustrated in each of these Figures, the graphical codes 32, 32', 32" are spatially redundant because they each include a repeating code portion 34 that is present at least twice. As mentioned in regard to FIG. 1, the repetitive nature of the visual code 32, 32', 32" enables decoding by capturing only a small portion (i.e., the repetitive/repeating portion 34 or any cyclic permutation including the glyphs 36 of the repetitive portion 34) of the entire code 32, 32', 32".

The embodiments shown in FIGS. 2 through 4 are examples of visual codes 32, 32', 32" that have the repeating code portion 34 repeated in a continuous cyclic fashion with a user-specified cyclic dimension having a user-specified number of glyphs. In these embodiments, the entire visual code 32 is associated with a group of code words and each code word includes the user-specified number of glyphs. The code words of these embodiments are cyclic transformations of each other (e.g., see repeating code portions 34 and 34' in FIG. 2). These code words are mapped to a single decoded value such that decoding accounts for the continuous cyclic fashion. Each of the user-selected glyphs in the set and its assigned preset orientation will enable "N" number of the total bits, and will be grouped to a single character in a visual alphabet. Any cyclic permutation of the characters in the repeating code portion will be interpreted as the single decoded value.

For the continuous codes disclosed herein, there is no identified beginning or end, and thus no need for markings which identify and beginning or end.

When generating any type of graphical code 32, 32', 32", the user can select colors and/or patterns for the glyphs 36 and/or the background of the code 32, 32', 32". Each of the examples shown in FIGS. 2 through 4 will be discussed as if the user is creating the visual code 32, 32', 32" for a label 30.

Referring specifically to FIG. 2, one embodiment of the visual code 32, which includes a single glyph 36, is depicted. When generating this type of visual code 32, a user is presented with a graphical alphabet including all available glyphs 36 or symbols. When it is desired that the same glyph 36 be used throughout the visual code 32, the user selects the single glyph 36 (e.g., the arrow or mouse pointer shown in FIG. 2) by clicking on the picture of the glyph 36, highlighting the desired glyph 36 that is present in a list of available glyphs, or another like method.

As mentioned above, after the glyph 36 is selected, the user is asked to select a spatial arrangement for the visual code 32. In this embodiment, the user selects a single line arrangement. The visual code generation program will then provide the user with the option of creating a continuous single line code or multiple non-continuous single line codes that will include the repeating code portion 34. In this embodiment, the program will also set forth a prompt requiring the user to select the cycle length which corresponds to the number of glyphs 36 to be included in a cycle, subject to the constraint that an entire cycle of the repeating code portion 34 can be captured in a single image. The program may set forth suitable options for the cycle length or may provide a maximum cycle length that can be selected. In a single line spatial arrangement, the cycle length is the number of glyphs 36 that are to be included in one repetitive portion 34 of the graphical code 32. As illustrated in FIG. 2, the cycle length of the repeating code portion 34 is eight. Even though the same type of glyph 36 is used and some of the same rotation angles are used within the repeating portion 34, the entire sequence of the glyphs 36 is not repeated until after the eighth symbol, and thus the cycle length of the repeated portion 34 in FIG. 2 is eight. The repeating code portion 34 in this embodiment has eight spatial locations for encoding.

After the user selects the glyph 36 and the spatial arrangement, he/she will be prompted to select from a number of allowed orientations of each glyph 36 in the repetitive portion 34. The user may also be prompted to provide, a reference angle (see the axis labeled 0° in FIG. 2). The reference angle is often 0 (right-horizontal axis), but the user may select a different reference angle for aesthetic reasons. In this embodiment, each glyph 36 in the entire graphical alphabet can appear at up to 16 different angles (angle differences of at least 22.5°) in order to ensure recovery of the angle differences between glyphs 36 and the reference angle, or between glyphs 36.

For this particular graphical code 32, there is an alphabet having a size equal to 16=1 glyph×16 possible orientation possibilities, which is used to encode 4-bits (i.e., $2^4$=16) per spatial location. There are 8 spatial locations in the repeating code portion 34, and thus the repeating code portion can encode 8×4=32 total bits. This has a factor 8 redundancy to support shift-redundancy, such that the information encoded in any 8 consecutive glyphs will be equivalent. This induces a reduction of the code size by a factor of 8 (or $2^3$ or 3 bits), as every 8 codes related by cyclic permutations of the glyphs 36 is mapped to the same meaning. This leaves a 29 bit code, which is sufficient for encoding standard barcode information (12-14 bits) plus 15-17 bits of identification information covering tens of thousands of item-IDs, or batch numbers.

The stippling/shading behind the glyphs 36 shown in FIG. 2 represents a background color that may be selected for the final label 30.

It is to be understood that encoding is based upon a multitude of geometrical metrical properties of the glyph collection including the identify of each glyph set of selected glyphs 36 by its geometrical shape, the angular orientation of each glyph from the set of possible orientations, and the geometrical arrangement of the glyphs 36 in the repeating code portion 34. As such, each glyph 36 encodes more than one bit, thus providing an advantage over on/off (binary) encoding in terms of number of visual elements required to encode a given number of bits. This is particularly advantageous if each glyph 36 should be large enough for its shape and orientation to be distinguishable by a capture device 26. Color and/or color-patterns are not used to encode, and thus the user has design flexibility in creating the color palette for the visual code 32 and the label 30 or image. For example, the glyph color and/or background color and/or pattern may be changed across the label, but the geometrical attributes (i.e., glyph shape and orientation) are consistent for each element of repeating portion 34 of the visual code 32, regardless of their position in the single line strip.

It is to be understood that when the repeated portion 34 is presented in a continuous and cyclic fashion (as shown in FIG. 2), capturing any permutation of glyphs 36 (which includes a number of glyphs 36 corresponding to the cycle length) will enable proper recognition and decoding. As such, the embodiment shown in FIG. 2 has a cycle length equal to 8×1. The cycle length also refers to the number of consecutive glyphs 36 in the entire code 32 that need to be captured to ensure suitable decoding. The cycle length includes a single occurrence of the repeating code portion 34. The sequence of eight glyphs 36 shown in dashed line 34' in FIG. 2 can be recognized and decoded because this sequence is a cyclic permutation of the repeating code portion 34.

Referring now to FIG. 3, one embodiment of the graphical code 32', which includes a plurality of different glyphs 36, 36', 36", 36''', is depicted. When generating this type of graphical code 32', a user is presented with the graphical alphabet including all available glyphs 36, 36', 36", 36''' or symbols. The user can select multiple glyphs 36, 36', 36", 36''' using the same techniques previously described for the selection of the single glyph 36. In the embodiment shown in FIG. 3, four glyphs 36, 36', 36", 36''' are selected.

After the glyphs 36, 36', 36", 36''' are selected, the user is asked to select the spatial arrangement. In this embodiment, the user selects a multi-line arrangement. The visual code generation program will then provide the user with the option of creating a continuous multi-line code or multiple non-continuous multi-line codes that will include the repeating code portion 34. In this embodiment, the program will also set forth a prompt requiring the user to select cycle dimensions subject to the constraint that the entire cycle includes the repeating code portion 34 and can be captured in a single image. The program may set forth suitable options for the cycle dimensions or may provide a maximum size for the cycle dimensions that can be selected. The example embodiment shown in FIG. 3 is a two-dimensional code with a repeating code, portion 34 of a 4×2 rectangle. The repeating code portion 34 is cyclic with a cycle length of 4 in the horizontal direction (i.e., right to left or left to right across the width of the paper). Each of the 8 positions in the 4×2 rectangle can include any of the glyphs in the selected four-glyph set, for example, the pencil, hand, mouse click arrow, and skinny arrow. It is to be understood that the example shown in FIG. 3 is one manifestation of the many possible repeating code portions 34 that are available with this alphabet.

Similar to the embodiment described in reference to FIG. 2, after the user selects the glyphs 36, 36', 36", 36''' and the spatial arrangement, he/she will be prompted to select the orientation set allowed for each glyph 36, 36', 36", 36''' in the repetitive portion 34. In this example, each glyph 36, 36', 36", 36''' can appear at up to 16 different angles (every 22.5°), and thus when four glyphs 36, 36', 36", 36''' are selected, 64 (16×4) different glyph/orientation combinations are available for selection, such that each visual element of the repeating code portion 34 will encode log 2(64)=6 bits.

The encoding power (bit-depth) of the visual code depends on the size of the set of selected glyphs 36, the size of the set of their possible orientations, and the number of glyphs 36 in the repeating code portion 34. As such, in the example shown in FIG. 3, 48 bits may be encoded (i.e., 6 bits/symbol×8 symbols in the 4×2 coding window). If shift redundancy in the horizontal direction (e.g., factor of 4 or $2^2$ or 2 bits) and flip redundancy (factor of 2 or $2^1$ or 1 bit) are accounted for, 3 bits are subtracted, leaving 45 bits that can be encoded in the repeating code portion 34 for the graphical code 32'. In one example, 12 bits of standard barcode information and 33 bits of identification information are encoded in the repeated portion 34 capable of encoding 45 bits of information. This is sufficient for identifying $2^{33}$ (about 2 billion) items.

It is to be understood that when the repeated portion 34 is presented in a continuous and cyclic fashion (as shown in FIG. 3), capturing any 4×2 glyph window will enable proper recognition and decoding. The cycle of 4×2 glyphs 36, 36', 36", 36'" shown in dashed line 34' in FIG. 3 can be recognized and decoded because this window can be identified as a cyclic horizontal permutation or transformation of the repeating code portion 34.

The varying stippling/shading behind the glyphs 36, 36', 36", 36'" shown in FIG. 3 represents a background color transition that may be selected to adapt to the colors of the final label 30.

Referring now to FIG. 4, still another embodiment of a visual code 32" is illustrated. This embodiment illustrates how during creation of the label 30, a user can adjust the color settings in order to create a background for the label 30 which incorporates the visual code 32". The glyphs 36, 36', 36", 36'" are shaded and the background is white (although any other desirable color could be selected). When used as the background of the label, the glyphs 36, 36', 36", 36'" are dark enough to be captured by the mobile device 26, but are faint enough to act as a background for any other information that may be placed over the graphical code 32". It is to be understood that this particular embodiment may make up all or a portion of the background of a label 30. The glyphs 36, 36', 36", 36'" are outlined and darkened in FIG. 4 for illustrative purposes, but it is to be understood that the outlining could be removed and shading of the glyphs 36, 36', 36", 36'" could be lightened in order to create a desirable background.

The embodiment of the graphical code 32" shown in FIG. 4 includes a plurality of different glyphs 36, 36', 36", 36'". When generating this type of graphical code 32', a user is presented with the graphical alphabet including all available glyphs 36, 36', 36", 36'" or symbols. The user can select multiple glyphs 36, 36', 36", 36'" using the same techniques previously described for the selection of the single glyph 36. In the embodiment shown in FIG. 4, four glyphs 36, 36', 36", 36'" are selected.

After the glyphs 36, 36', 36", 36'" are selected, the user is asked to select the spatial arrangement. In the example shown in FIG. 4, the spatial arrangement is a grid with multiple rows and columns. This type of visual code is two-dimensional. The example in FIG. 4 includes a repeating code portion 34 of a 3×3 square, such that it is cyclic with a cycle dimension of 3 in both horizontal and vertical directions. Each of the 3×3 positions in a cycle can contain any of the glyphs 36, 36', 36", 36'" in the user-selected glyph set {pencil, mouse-click arrow, hand, skinny arrow}. It is to be understood that the example shown in FIG. 4 is one manifestation of the many possible repeating code portions 34 that are available with this alphabet.

Similar to the embodiment described in reference to FIG. 3, after the user selects the glyphs 36, 36', 36", 36'" and the spatial arrangement, he/she will be prompted to select the orientation set allowed for each glyph 36, 36', 36", 36'" in the repetitive portion 34. In this example, each glyph 36, 36', 36", 36'" can appear at 16 different angles (approximately every 22.5°), and thus when four glyphs 36, 36', 36", 36'" are selected, 64 (16×4) different glyph/orientation combinations are available for selection, such that each visual element of the repeating code portion 34 will encode log 2(64)=6 bits. As such, 54 bits (6 bits/symbol×9 symbols) may be encoded in the example shown in FIG. 4. If shift redundancy in two dimensions (e.g., factor of 9 or approximately 3 bits), 2D flip redundancy (factor of 4 or $2^2$ or 2 bits), and 90° rotation redundancy (factor 4 or 2 bits) are accounted for, approximately 7 bits are subtracted, leaving approximately 47 bits that can be encoded in the repeating code portion 34 for the graphical code 32". In one example, 12 to 14 bits of standard barcode information and 33 to 35 bits of identification information are encoded in the repeated portion 34 capable of encoding 47 bits of information.

It is to be understood that when the repeated portion 34 is presented in a continuous and cyclic fashion (as shown in FIG. 4), and capturing any 3×3 glyph context window will enable proper recognition and decoding. The window of 3×3 glyphs 36, 36', 36", 36'" shown in dashed line 34' in FIG. 4 can be recognized and decoded because this window can be identified as a cyclic horizontal or vertical permutation of the repeating code portion 34.

As previously mentioned, each repeating code portion 34 includes all of the desired encoded information and is spatially scattered across the label 30 or image. It is to be understood that the repeating portion 34 may be continuous and repeated across the entire label 30 (see, e.g., FIGS. 5A through 5C), or can be isolated elements that are strategically placed at different areas on the label 30 (see, e.g., FIG. 8). Still further, multiple labels 30 including different occurrences of the repeating code portion 34 may also be used. For any of the embodiments disclosed herein, it is to be understood that the repeating code portion 34 is included on at least two different areas so that the repeating code portion 34 is visible from any angle (e.g., even if the object 28 bearing the repeating code portion 34 is rotated so that the back of the object 28 faces a consumer). Therefore, in one embodiment, the label 30 and the graphical code 32, 32', 32" may be designed to wrap around the perimeter of the object 28, or may be split between 2 or more sides/surfaces of an object 28 (e.g., front and back, all sides of a cube, etc.). In one embodiment, the repeating code portion 34 should be included such that it is visible from all angles at which the object 28 is likely to be displayed.

When a user creates the repeating code portion 34, he/she incorporates the repeating code portion 34 (whether generated as a continuous code 32 or separate occurrences of the portion 34) into one or more labels 30 or images. The label(s) 30 or images include the code 32, 32', 32", as well as product information, manufacturer information, contact and/or website information, printer information, graphics, and/or the like. The additional information is added by the user by manually typing information into desirable spots of the label 30 or image, cutting and pasting information from another program or file, by uploading images and/or text into desirable spots of the label, and/or by using one or more program tools to create the serialization needed.

Figure 5:
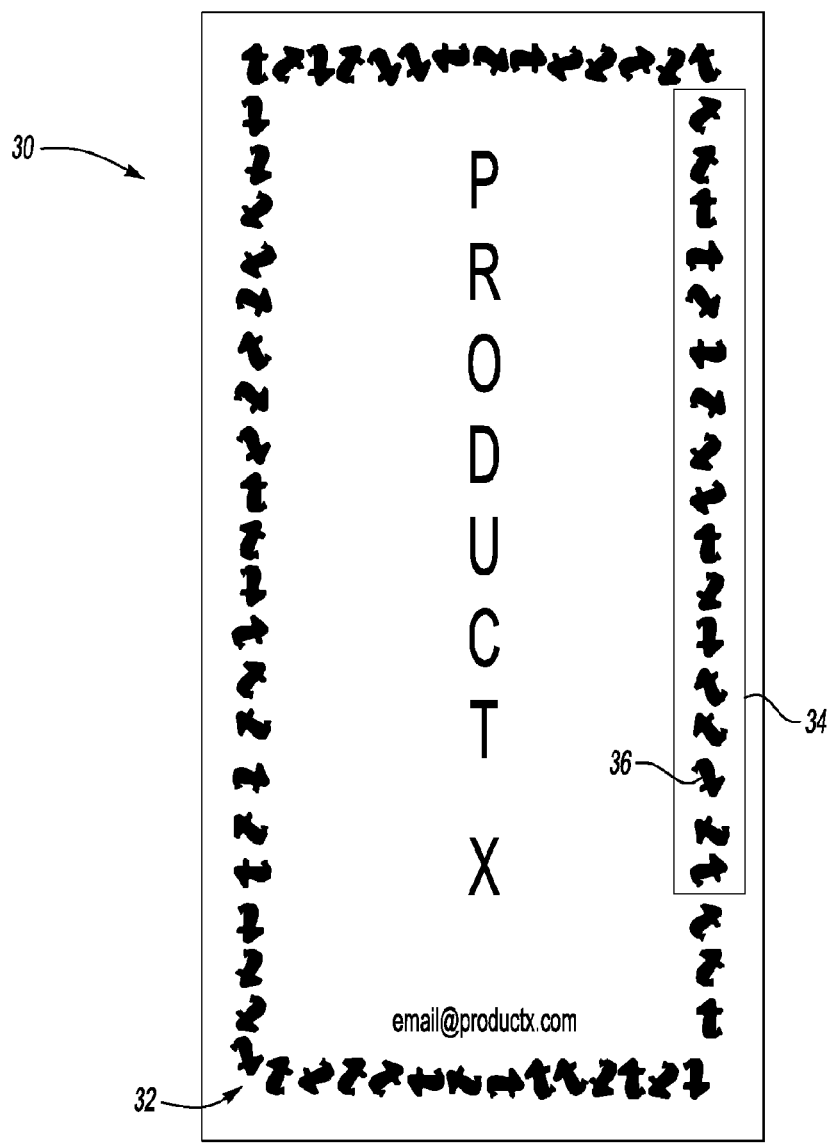
FIG. 5 is an embodiment of label including an embodiment of a designer-adaptive visual code.

As previously mentioned, when a label 30 is used, the label 30 design may be selected from pre-designed templates or the user may create the entire label(s) 30 so that the generated code 32, 32', 32" aesthetically blends with the label(s) 30. When creating the label(s) 30, the user can select the shape of the label(s) 30, the spatial arrangement including the repeating code portion 34 and its position on the label(s) 30, and the colors of the label elements. The user can also use the set of glyphs 36, 36', 36", 36'" selected for the visual code 32 (perhaps with different sizes, colors, etc.), as part of the overall label design, so the visual code 32 visually integrates in a desired manner with the overall design. FIGS. 5, 8 and 8 will be used to illustrate the selections involved in forming the label(s) 30 with the graphical codes 32, 32', 32".

The label 30 illustrated in FIG. 5 may be suitable for an advertisement or may be adhered to respective sides of an object 28. In this embodiment, the label shape is a rectangle, and the position of the visual code 32 creates a border for the selected label shape. It is to be understood that the visual code generation program will incorporate the code 32 in the desired position once the user selects the parameters for the repeating portion 34 (including spatial arrangement and position on the label 30) and the label shape. For example, when generating the code 32 shown in FIG. 5, the user may select the "t" glyph 36 and the allowed orientations of the glyphs 36 with the single line geometry. The cycle length will be determined automatically by the program, or the program will provide the user with suitable cycle length options that will support the required number of bits in the digital code. In this example, the cycle length is 17. When the user selects the label shape and the border option for the code 32, the label generation program will automatically fill in the label with the code 32 so that the repeating code portion 34 is repeated accurately, and is rotated to fit the selected label dimensions. As shown in FIG. 5, the repeating portion 34 is present in the code 32 four times, and is appropriately rotated to create the border effect (note the glyphs 36 are upside down along the bottom portion of the border relative to the glyphs along the top portion of the border). It is to be understood that during decoding, this additional rotation is accounted for.

The label 30 shown in FIG. 5 includes the name of the product (e.g., Product X) and also includes an email address for obtaining more information (e.g., email@productx.com). This information may be typed in, cut and pasted, uploaded, etc.

Colors and/or patterns may also be used in the label 30. As a non-limiting example, the words "Product X" could be presented in bright blue font while the code 32 may be presented in light blue font.

In FIG. 5, the repeated portion 34 is presented in a continuous and cyclic fashion, and capturing any 17×1 glyph cycle will enable proper recognition and decoding.

Figure 6A:
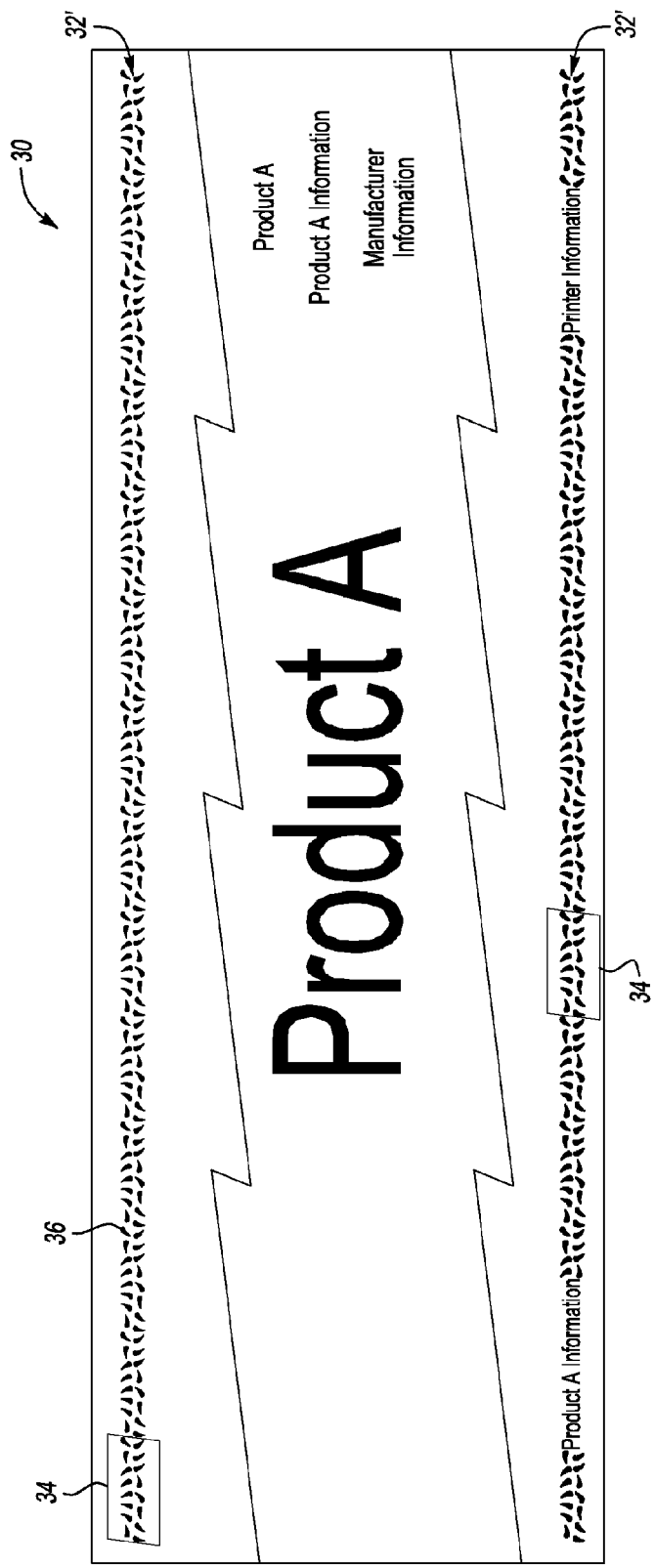

Alternate embodiments of another label 30 and 30' are shown in FIGS. 6A and 6B. In these embodiments, the label shape is a rectangle, and the position of the graphical code 32' creates an upper and lower border for the selected label shape. It is to be understood that the visual code generation program will incorporate the code 32' in the desired position once the user selects the parameters for the repeating portion 34 (including spatial arrangement and position on the label 30) and the label shape. For example, when generating the code 32', the user may select the tear drop or leaf shaped glyph 36 and the allowed orientations of the glyphs 36 with the multi-line geometry. When the user selects the label shape, and the upper and lower border option for the code 32', the label generation program will automatically fill in the label with the code 32' so that the repeating code portion 34 is repeated multiple times accurately and fits the selected label dimensions.

The labels 30 and 30' in FIGS. 6A and 6B illustrate the design freedom for the user of the system 10. In FIG. 6A, each glyph 36 of the repeating code portion 34 is selected to have color (e.g., primary colors, secondary colors, etc.), while in FIG. 6B, each glyph 36 is outlined, and a color is selected as a background BG for the code 32'. With the design flexibility that is enabled with the system 16, the user may select one or more colors and/or patterns for the glyphs, backgrounds, etc.

The labels 30 and 30' shown in FIGS. 6A and 6B include the name of the product (e.g., Product A) and also includes product information (i.e., type of product, usefulness, ingredients, etc., for example, if product A were a dandruff shampoo, this information may include that the product fights dandruff and seborrheic dermatitis, that the product includes 2% pyrithione zinc, or the like), manufacturer information (e.g., name, address, contact information), warning information (e.g., avoid contact with eyes, call poison control if swallowed, etc.), and/or printed information (e.g., name, address, contact information). This information may be typed in, cut and pasted, uploaded, etc.

Figure 6C:
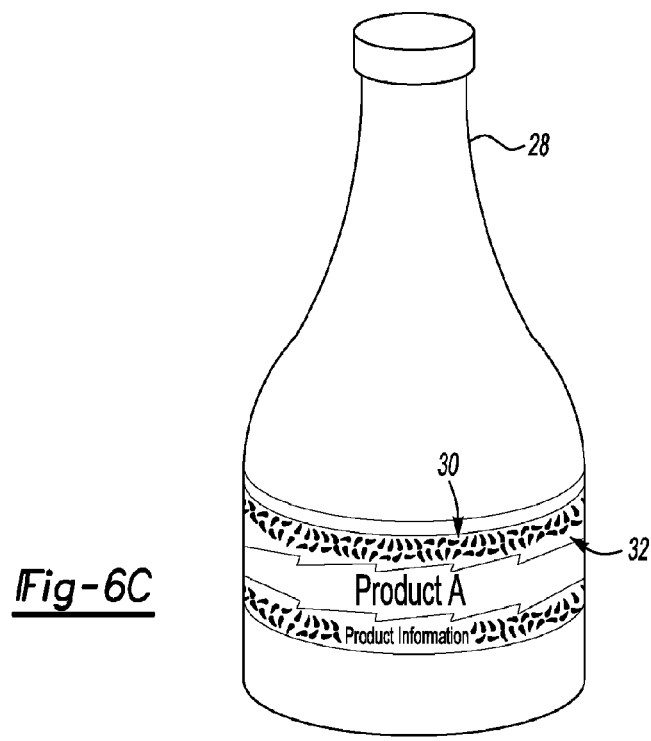
FIG. 6C is a semi-schematic perspective view of a product having the embodiment of the label shown in FIG. 6A attached thereto.

The labels 30 and 30' shown in FIGS. 6A and 6B may be particularly suitable for being wrapped around the perimeter of any object 28, such as the bottle shown in FIG. 6C, which includes the label 30 from FIG. 6A. As illustrated, the code 32' extends around the bottle 28 both at the top and bottom portions of the label 30. A consumer can thus capture a digital image of the repeating portion 34 from any angle, regardless of the position of the bottle 28 at the time of capture. Since the repeating portion 34 is present so many times, a consumer or other person capturing the digital image need not have to focus on a particular portion of the code 32 and will likely capture the repeating portion 34 or one of its cyclic permutations.

In FIGS. 6A through 6C, the repeated portion 34 is presented in a continuous and cyclic fashion, and the graphical code 32 has a coding window equal to 8×2. Any window of 8×2 glyphs 36 can be recognized and decoded because each of these windows will contain a horizontal cyclic permutation or transformation of the 16 glyphs present in the present in the repeating code portion 34.

Figure 7:
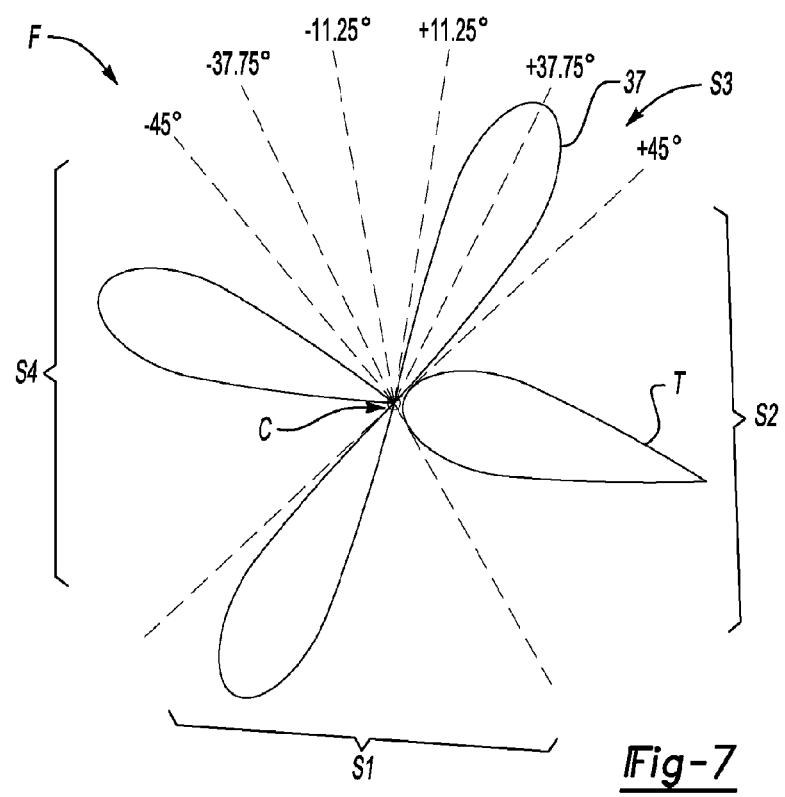
FIG. 7 is a schematic diagram of an embodiment of a coding flower illustrating 90° sectors in which glyphs are located and possible orientations of the glyphs in the 90° sectors.
Figure 8A:
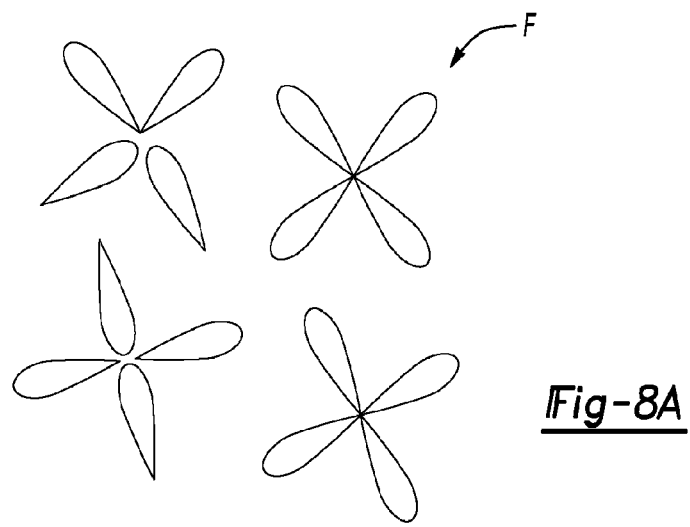
FIG. 8A through 8E are schematic illustrations of embodiments of spatial compact arrangements including embodiments of the encoding flower.
Figure 8B:
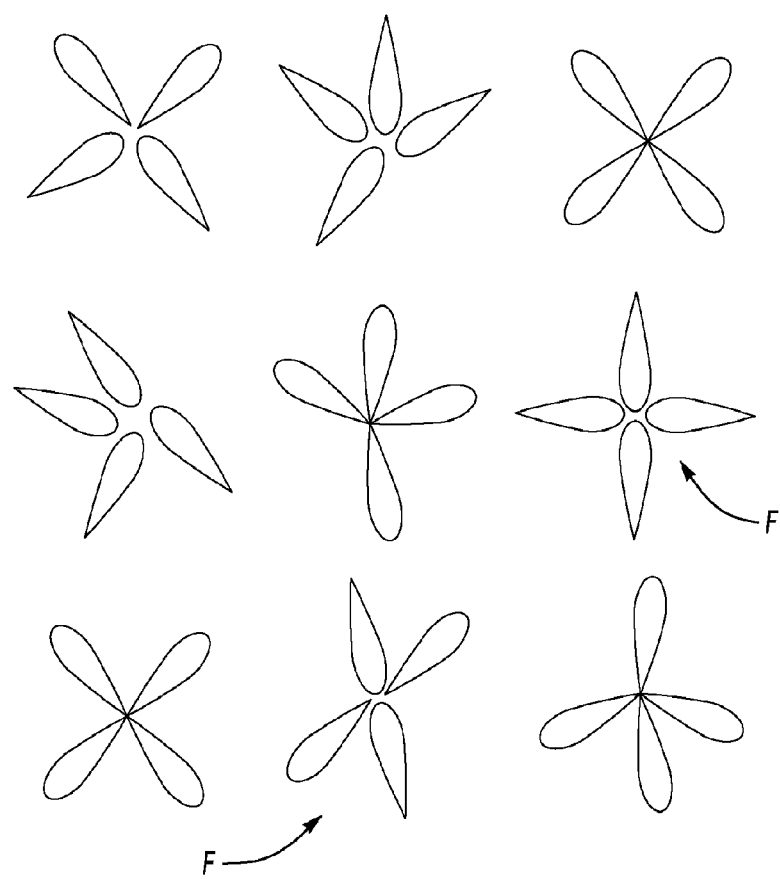
Figure 8C:
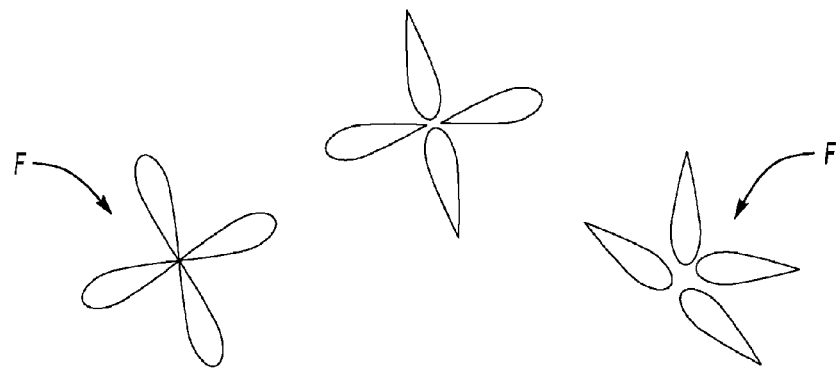
Figure 8D:
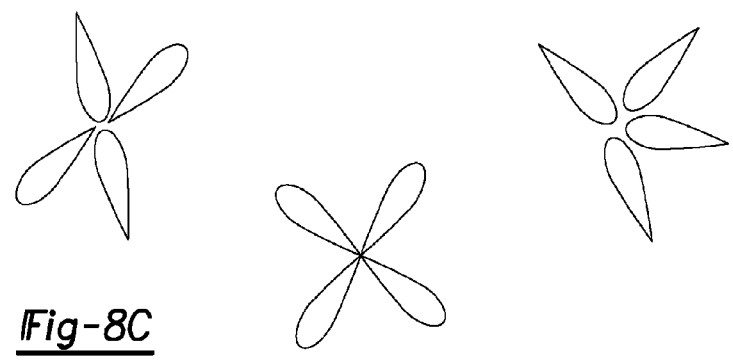
Figure 8D:
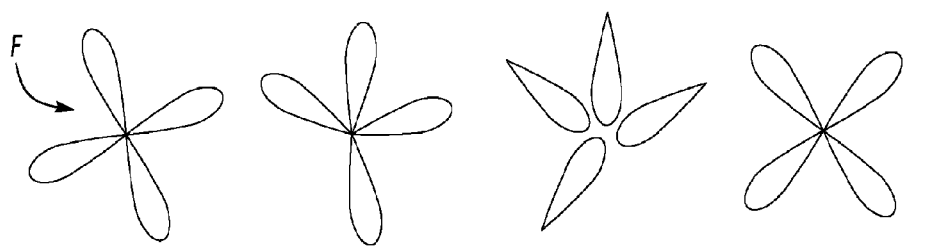
Figure 8D:
Figure 8E:
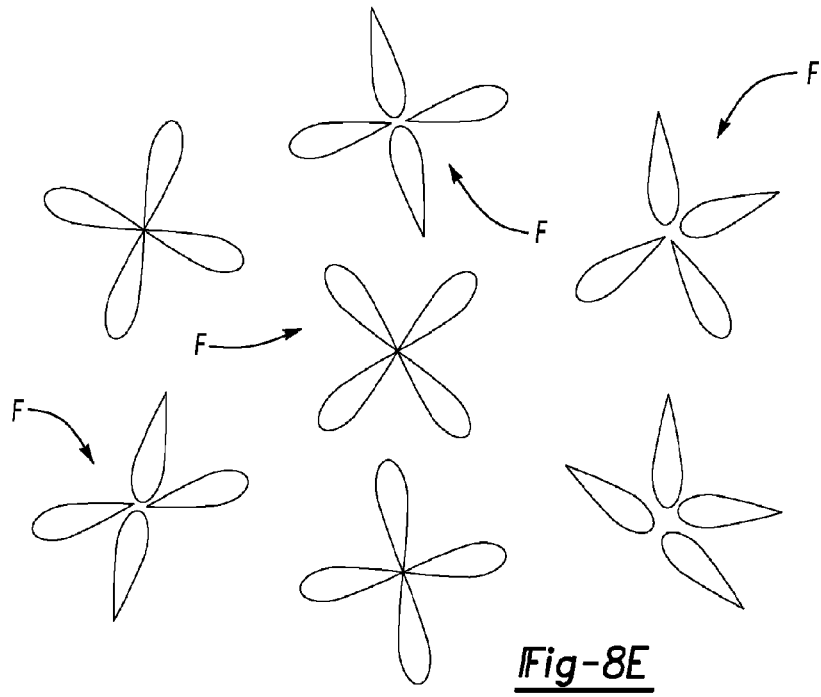

Referring now to FIG. 7, one embodiment of a coding flower F is depicted. The coding flower F is designed using four 90° sectors S1, S2, S3, S4, with medial axes (middle angles) at 0°, 90°, 180°, and 270°, respectively. Each sector S1, S2, S3, S4 is further divided into four equal 22.5° sub-sectors, such that their medial axes are at angles −37.75°, −11.25°, 11.25°, and 37.75° relative to the medial axis of their parent sector. While the angle and sector dashed lines are shown in FIG. 7, it is to be understood that these are guidelines for forming coding flower F and are not visible in the final visual code. The four medial axes of the sub-sectors of each sector S1, S2, S3, S4 are the possible orientations for placement of a leaf or petal glyph 37 within each sector S1, S2, S3, S4. As such, the angles of each leaf glyph 37 relative to the medial axis of each sector encodes $\log_2(4)=2$ bits.

The leaf glyph 37 has a tip T that can be oriented inward (i.e., toward a center C of the coding flower F) or outward (i.e., away from the center C of the coding flower F). The leaf glyphs 37 in segments S1, S3, and S4 of FIG. 7 are oriented inward while the leaf glyph 37 in segment S2 is oriented outward. The polarity of each leaf (inwards/outwards) encodes one additional bit for each leaf glyph 37.

It is to be understood that each sector S1, S2, S3, S4 contains exactly one leaf glyph 37 at one of the four allowed angles and at one of the two allowed orientations relative to the flower center C. There are 8 possible combinations of angle and polarity for the leaf glyph 37 in any of the sectors S1, S2, S3, S4, which is equal to 3 bits of information. Since each encoding flower F includes 4 glyphs, and thus can encode up to 12 bits of information.

The encoding flower F may be incorporated into relatively simple arrangements (e.g., single lines, 2×2 cyclic dimensions, etc.), or more complex spatial arrangements (e.g., geometric rings, large arrangements including multiple coding flowers). Non-limiting examples of coding flower arrangements that can be used as the repeating code portion 34 are shown in FIGS. 8A through 8E. The example in FIG. 8A includes 4 coding flowers F in a 2×2 arrangement. Since each of the respective coding flowers F can encode 12 bits, this repeating code portion 34 can encode up to 48 bits (12 bits/flower×4 flowers). More bits can be encoded by using a larger arrangements that include more coding flower, such as i) the 3×3 structure shown in FIG. 8B, which can encode 108 bits (12 bits/flower×9 flowers), ii) the circular ring structure shown in FIG. 8C, which can encode 72 bits (12 bits/flower×6 flowers), iii) the square ring structure shown in FIG. 8D, which can encode 120 bits (12 bits/flower×10 flowers), and iv) the circular flower structure shown in FIG. 8E, which can encode 84 bits (12 bits/flower×7 flowers).

In order to encode still more bits in a coding flower F, two glyph shapes could be selected instead of one, which increases the encoding power of each symbol by 25% (from 3 bit to 4 bit), yielding a total of 16 bits for a single coding flower F.

Figure 9:
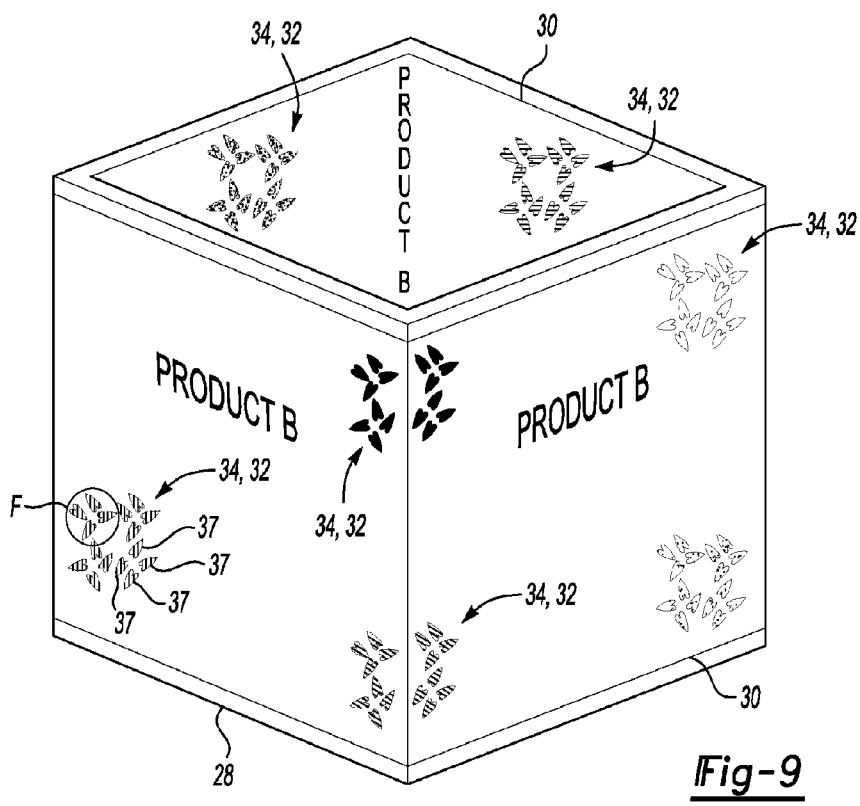
FIG. 9 is another embodiment of a product including another embodiment of a designer-adaptive visual code which includes a repeated coding flower geometrical arrangement.

Referring now to FIG. 9, another embodiment of a label 30 is depicted. In this embodiment, the object 28 is a cube and includes at least two labels 30, each of which includes the repeating portion 34. The graphical code 32 shown in FIG. 7 is non-cyclic and is made up of multiple discrete and non-continuous repeating code portions 34 which are placed at different areas of the labels 30. Each repeating portion 34 includes 4 coding flowers presented in a 2×2 arrangement. Each of flowers F includes 4 leaf-shaped glyphs 37 of a single type. Each of the leaf-shaped glyphs 37 is allowed 8 possible orientation (as previously described), and thus can encode 3 bits of information. As such, a single flower F can encode 12 bits of information, and the repeating code portion 34 can encode 48 bits of information (12 bits/flower×4 flowers=48). The repeating code portion 34 is repeated at least twice.

FIG. 9 illustrates the design flexibility with regard to color and/or patterns. As illustrated, each of the repeating code portions 34 has a different shading or stippling. It is to be understood that this is representative of different colors and/or patterns that may be used when creating the codes 32 and the labels 30. Since color is not taken into account when encoding the code portion 34 and code 32, a variety of colors and/or patterns may be used to decorate the label(s) 30.

As shown in FIG. 9, one of the labels 30 is designed to wrap around each of the four sides of the cubed object 28, and another of the labels 30 is designed to be adhered to the top (and/or bottom) of the cubed object 28. When multiple labels 30 are used for a single object 28, the repeating portion 34 of the graphical code 32 is included on each label 30. The repeating portion 34 may be included in a cyclic fashion (as shown, e.g., in FIGS. 5A through 5C) and/or in a random-looking fashion, as shown in FIG. 7. While the placement of the repeating code portions 34 appears random in FIG. 7, it is to be understood that the repeating code portions 34 are placed at different parts of the labels 30 so that if a portion of the product 28 is captured in a digital image, the portion captured will include at least one of the repeating code portions 34.

While the examples, provided herein include the graphical code 32, 32', 32" being generated prior to the remainder of the label(s) 30, it is to be understood that the label(s) 30 may be created first, and then the graphical code 32, 32', 32" can be created and incorporated into the label(s) 30.

Furthermore, the repeating code portions 34 have been outlined in some of the figures to facilitate understanding. However, it is to be understood that when label(s) are deployed on objects 28, the repeating code portion 34 will not be outlined and will blend with the overall label 30 as the code or as part of a continuous code.

In any of the embodiments disclosed herein, two types of repeating code portions 34 could co-exist on the same label 30 or in the same image (e.g., glyph strips/lines around the label 30 edges, and glyph flowers scattered on the label 30). In this embodiment, the number of encoded bits is the sum of the two types of repeating code portions 34.

While several embodiments have been described in detail, it will be apparent to those skilled in the art that the disclosed embodiments may be modified. Therefore, the foregoing description is to be considered non-limiting.

What is claimed is:

1. A designer-adaptive visual code, comprising:
    a user-selected set of glyphs having a size sufficient to recover geometric characteristics of at least one repeating code portion so as to generate an analyzable image when captured via a camera-equipped mobile device;
    a user-selected set of allowable glyph orientations relative to a user-selected reference angle; and
    a user-selected spatial arrangement of the glyphs including the at least one repeating code portion (34) to be visible on a surface from at least two different areas of the surface.

2. The designer-adaptive visual code of claim 1, wherein the at least one repeating code portion encodes a number of bits according to at least a size of the set of glyphs, a size of the set of allowable glyph orientations, and a number of glyphs in the at least one repeating code portion.

3. The designer-adaptive visual code of claim 1, wherein the at least one repeating code portion is non-continuous and is duplicated in multiple isolated locations on the surface.

4. The designer-adaptive visual code of claim 1, wherein the at least one repeating code portion is repeated on the surface in a continuous cyclic fashion with user-specified cycle dimensions containing a user-specified number of glyphs, and wherein the visual code is associated with a group of code words, each of which includes the user-specified number of glyphs, that are cyclic transformations of each other and that are mapped to a single decoded value such that decoding of the visual code accounts for the continuous cyclic fashion.

5. The designer-adaptive visual code of claim 4, wherein the surface is a label for an object, and wherein the designer-adaptive visual code has a length configured to extend around a perimeter of the object.

6. The designer-adaptive visual code of claim 1, wherein the user-selected spatial arrangement of the glyphs is selected from a single row, multiple rows, a grid, and a repeated compact geometrical arrangement.

7. The designer-adaptive visual code of claim 6, wherein the repeated compact geometrical arrangement is a coding flower including four leaf glyphs, each of which is located within one 90° sector.

8. The designer-adaptive visual code of claim 1, wherein:
    the repeating code portion includes a user-specified number of glyphs;
    the visual code is associated with a group of code words, each of which includes the user-specified number of glyphs, that are related to each other by rotation or flipping; and
    the code words are grouped to a single decoded value to render glyph encoding and glyph decoding invariant under at least one of rotation or flipping of the surface.

9. The designer-adaptive visual code of claim 1, wherein one of:
    the user-selected spatial arrangement of the glyphs identifies a product and the encoded bits encrypt a specific identifier for the product; or
    the user-selected spatial arrangement of the glyphs is a template pattern, and the encoded bits encrypt identity of a product and a specific identifier for the product.

10. A system for creating a designer-adaptive visual code, the system comprising:
    computer readable code, embodied on a computer readable medium, for generating a digital code based upon a user-specified number of bits; and computer readable code, embodied on the computer readable medium, for generating the visual code by processing i) a user-selected set of glyphs, ii) a user-selected set of allowable glyph orientations, and a user-selected spatial arrangement of the glyphs including at least one repeating code portion that can encode the entire digital code.

11. The system of claim 10, further comprising:

computer readable code, embodiment on the computer readable medium, for encoding the digital code into the repeating code portion; and computer readable code, embodied on the computer readable medium, for integrating the repeating code portion into a user-selected format such that the repeating code portion is visible from at least two different areas of the format.

12. The system of claim 10, further comprising:

a mobile phone having an embedded camera; and a central computer system, including:
- a database configured to store and link the digital code to the repeating code portion;
- a computing device configured to read:
  - computer readable code, embodied on a medium, for visually searching the database to identify whether a patch of an image received from the mobile phone corresponds with one of a plurality of repeating code portions stored in the database; and
  - computer readable code, embodied on the medium, for decoding a digital code encoded in a repeating code portion that is visually identifiable in the patch of the image.

13. The system of claim 10, further comprising computer readable code, embodied on the computer readable medium, for processing receipt of user-selected colors for the visual code.

14. A method for creating a designer-adaptive visual code using a computer program, comprising:

receiving a user-input identifying a number of bits to be encoded;

presenting a glyph alphabet, a set of allowable glyph orientations, and spatial glyph arrangements, wherein a size of the glyph alphabet, a size of the set of allowable glyph orientations, and a number of glyphs in the spatial glyph arrangements presented are based on the number of bits to be encoded;

receiving a user-selected set of glyphs selected from the glyph alphabet, a user-selected set of allowable glyph orientations selected from the set of allowable glyph orientations; and a user-selected spatial glyph arrangement selected from the spatial glyph arrangements; and generating a repeating code portion based upon the user-selected glyphs, the user-selected glyph orientations, and the user-selected spatial glyph arrangement.

15. The method of claim 14, further comprising:

receiving specifications for a user-designed label; and integrating the repeating code portion into the user-designed label in accordance with the received specification such that one of:
- the repeating code portion is non-continuous and is duplicated in multiple isolated locations on the label; or
- the repeating code portion is repeated on the label in a continuous cyclic fashion with user-specified cyclic dimensions containing a user-specified number of glyphs.

* * * * *